(12) United States Patent
Stepps

(10) Patent No.: US 9,192,001 B2
(45) Date of Patent: Nov. 17, 2015

(54) REACTIVE POWER BALANCING CURRENT LIMITED POWER SUPPLY FOR DRIVING FLOATING DC LOADS

(71) Applicant: Dale B. Stepps, Plantation, FL (US)

(72) Inventor: Dale B. Stepps, Plantation, FL (US)

(73) Assignee: Ambionce Systems LLC., Plantation, FL (US)

( * ) Notice: Subject to any disclaimer, the term of this patent is extended or adjusted under 35 U.S.C. 154(b) by 184 days.

(21) Appl. No.: 13/902,027

(22) Filed: May 24, 2013

(65) Prior Publication Data

US 2014/0268941 A1    Sep. 18, 2014

Related U.S. Application Data

(60) Provisional application No. 61/792,831, filed on Mar. 15, 2013.

(51) Int. Cl.
*H02M 7/217* (2006.01)
*H05B 33/08* (2006.01)
*H02M 1/42* (2007.01)

(52) U.S. Cl.
CPC ......... *H05B 33/0809* (2013.01); *H02M 1/4266* (2013.01); *Y02B 20/341* (2013.01); *Y10T 307/406* (2015.04)

(58) Field of Classification Search
CPC .......... H02M 7/217; H02M 5/06; H02M 7/06
USPC .......... 363/16, 17, 41, 44, 45, 53, 65, 89.126; 315/158, 159, 185 R, 193, 209 R, 224, 315/225
See application file for complete search history.

(56) References Cited

U.S. PATENT DOCUMENTS

| D60,004 | S | 12/1921 | Adam |
| D78,750 | S | 6/1929 | Gunnison |
| D129,357 | S | 9/1941 | Greppin |
| D132,276 | S | 5/1942 | Greppin |
| D143,336 | S | 12/1945 | Morrison |
| D150,357 | S | 7/1948 | Herbster |
| D155,680 | S | 10/1949 | Baker |
| D164,606 | S | 9/1951 | Schlage |
| D234,797 | S | 4/1975 | De John et al. |
| 4,369,490 | A * | 1/1983 | Blum .............................. 363/48 |

(Continued)

FOREIGN PATENT DOCUMENTS

| WO | WO 2009/064433 | 5/2009 |
| WO | WO 2009/064434 | 5/2009 |

*Primary Examiner* — Rajnikant Patel
(74) *Attorney, Agent, or Firm* — Malloy & Malloy, P.L.

(57) ABSTRACT

A capacitance based reactive power balancing current limited power supply (RPBCLPS) for driving floating DC loads utilizes capacitive reactance to limit current being supplied to a load, rather than inductance. A capacitor transfers charge from an AC current input to a DC load. A fuse electrically protects the capacitor from high frequency current harmonics. A diode clamp electrically protects the capacitor from voltage spikes. A rectifier converts the AC current input into DC current for driving the DC load. The reactive power balancing current limited power supply can be incorporated as a key component into reactive power balancing electrical power distribution systems. Such systems can comprise a grid configuration structured to distribute the AC electrical power from a utility source to a plurality of DC loads. Further, the DC loads can be cooperatively located to provide functional distributed capacitance throughout a substantial portion of the grid.

27 Claims, 8 Drawing Sheets

(56) References Cited

U.S. PATENT DOCUMENTS

| | | |
|---|---|---|
| 4,396,882 A * | 8/1983 | Kellenbenz .................. 323/278 |
| 4,471,268 A * | 9/1984 | Brown et al. ................. 315/178 |
| D303,437 S | 9/1989 | Mason |
| 4,910,654 A * | 3/1990 | Forge ............................ 363/49 |
| D339,651 S | 9/1993 | Vieyra |
| D365,159 S | 12/1995 | Tinen |
| 5,604,411 A | 2/1997 | Venikitasubrahmanian et al. |
| D385,897 S | 11/1997 | Lin |
| 5,738,436 A | 4/1998 | Cummings et al. |
| D397,482 S | 8/1998 | Binsukor |
| D405,216 S | 2/1999 | Porter et al. |
| D413,137 S | 8/1999 | Lin |
| 5,953,221 A * | 9/1999 | Kuhn et al. .................... 363/53 |
| 6,013,988 A | 1/2000 | Bucks et al. |
| 6,016,038 A | 1/2000 | Mueller et al. |
| 6,094,014 A | 7/2000 | Bucks et al. |
| 6,147,458 A | 11/2000 | Bucks et al. |
| 6,160,359 A | 12/2000 | Fleischmann |
| 6,188,177 B1 | 2/2001 | Adamson et al. |
| 6,211,626 B1 | 4/2001 | Lys et al. |
| 6,234,645 B1 | 5/2001 | Borner et al. |
| 6,234,648 B1 | 5/2001 | Burner et al. |
| 6,250,774 B1 | 6/2001 | Begemann et al. |
| 6,304,464 B1 | 10/2001 | Jacobs et al. |
| 6,375,338 B1 | 4/2002 | Cummins et al. |
| 6,388,388 B1 | 5/2002 | Weindorf et al. |
| 6,472,828 B1 | 10/2002 | Pruett et al. |
| D469,211 S | 1/2003 | Homann |
| 6,561,690 B2 | 5/2003 | Balestriero et al. |
| 6,577,512 B2 | 6/2003 | Tripathi et al. |
| 6,586,890 B2 | 7/2003 | Min et al. |
| 6,608,617 B2 | 8/2003 | Hoffknecht et al. |
| 6,617,795 B2 | 9/2003 | Bruning |
| 6,642,674 B2 | 11/2003 | Liao et al. |
| 6,692,136 B2 | 2/2004 | Marshall et al. |
| D490,182 S | 5/2004 | Benensohn |
| 6,744,223 B2 | 6/2004 | Laflamme et al. |
| D493,188 S | 7/2004 | Brueck |
| 6,788,011 B2 | 9/2004 | Mueller et al. |
| 6,856,890 B2 | 2/2005 | Muto et al. |
| 6,922,022 B2 | 7/2005 | Bucks et al. |
| D509,016 S | 8/2005 | Benghozi |
| 6,972,525 B2 | 12/2005 | Bucks et al. |
| 6,975,079 B2 | 12/2005 | Lys et al. |
| 7,038,399 B2 | 5/2006 | Lys et al. |
| 7,129,933 B1 | 10/2006 | Nishikawa et al. |
| 7,183,727 B2 | 2/2007 | Ferguson et al. |
| 7,186,000 B2 | 3/2007 | Lebens et al. |
| 7,202,608 B2 | 4/2007 | Robinson et al. |
| 7,233,115 B2 | 6/2007 | Lys |
| 7,252,385 B2 | 8/2007 | Engle et al. |
| 7,256,554 B2 | 8/2007 | Lys |
| 7,262,559 B2 | 8/2007 | Tripathi et al. |
| D550,391 S | 9/2007 | Cesaro |
| D554,974 S | 11/2007 | Huang |
| D556,075 S | 11/2007 | Teiber et al. |
| 7,312,582 B2 * | 12/2007 | Newman et al. .......... 315/200 R |
| 7,329,024 B2 | 2/2008 | Lynch et al. |
| 7,348,736 B2 | 3/2008 | Piepgras et al. |
| 7,352,138 B2 | 4/2008 | Lys et al. |
| 7,358,681 B2 | 4/2008 | Robinson et al. |
| 7,358,706 B2 | 4/2008 | Lys |
| 7,394,212 B2 | 7/2008 | Wey et al. |
| 7,420,335 B2 | 9/2008 | Robinson et al. |
| 7,459,864 B2 | 12/2008 | Lys |
| D591,448 S | 4/2009 | Huang |
| 7,522,615 B2 | 4/2009 | Binder |
| D592,347 S | 5/2009 | Trott et al. |
| D592,348 S | 5/2009 | Trott et al. |
| 7,557,521 B2 | 7/2009 | Lys |
| 7,587,289 B1 | 9/2009 | Sivertsen |
| D602,193 S | 10/2009 | Soderman et al. |
| D602,195 S | 10/2009 | Soderman et al. |
| 7,602,158 B1 * | 10/2009 | Iacob ........................... 323/231 |
| D604,008 S | 11/2009 | Soderman et al. |
| 7,722,227 B2 | 5/2010 | Zhang et al. |
| 7,737,643 B2 | 6/2010 | Lys |
| 7,738,270 B2 * | 6/2010 | Chang ............................ 363/44 |
| 7,760,107 B1 | 7/2010 | Stepps et al. |
| 7,802,902 B2 | 9/2010 | Moss et al. |
| 7,810,960 B1 | 10/2010 | Soderman et al. |
| 7,878,692 B2 | 2/2011 | Soderman et al. |
| 7,980,736 B2 | 7/2011 | Soderman et al. |
| 8,011,794 B1 | 9/2011 | Sivertsen |
| 8,029,158 B2 | 10/2011 | Chen |
| 8,098,021 B2 | 1/2012 | Wang et al. |
| 8,154,221 B2 | 4/2012 | Godbole et al. |
| 8,159,198 B2 * | 4/2012 | Dishman et al. .............. 323/255 |
| 8,226,272 B2 | 7/2012 | Chen |
| 8,237,381 B2 | 8/2012 | Harbers et al. |
| 8,348,470 B2 | 1/2013 | Liu et al. |
| 8,360,614 B1 | 1/2013 | Soderman et al. |
| 8,398,253 B2 | 3/2013 | Sivertsen |
| 8,531,226 B2 | 9/2013 | Montalbo et al. |
| 8,534,873 B1 | 9/2013 | Soderman et al. |
| 8,573,812 B2 | 11/2013 | Joung et al. |
| 8,643,300 B1 | 2/2014 | Stepps et al. |
| 8,714,797 B2 | 5/2014 | Hwu et al. |
| 8,797,766 B2 | 8/2014 | Delpapa et al. |
| 8,957,610 B2 | 2/2015 | Lee |
| 9,014,829 B2 | 4/2015 | Chemel et al. |
| 9,054,584 B2 | 6/2015 | Haight et al. |
| 2003/0102845 A1 | 6/2003 | Aker et al. |
| 2004/0135523 A1 | 7/2004 | Takahashi et al. |
| 2005/0213047 A1 | 9/2005 | Slobodin et al. |
| 2006/0126328 A1 | 6/2006 | Coushaine |
| 2007/0114010 A1 | 5/2007 | Upadhya et al. |
| 2007/0139923 A1 | 6/2007 | Negley et al. |
| 2007/0223230 A1 | 9/2007 | Trojanowski et al. |
| 2007/0242461 A1 | 10/2007 | Reisenauer et al. |
| 2007/0279821 A1 | 12/2007 | Sells |
| 2009/0109052 A1 | 4/2009 | Stepps et al. |
| 2009/0122553 A1 | 5/2009 | Soderman et al. |
| 2009/0195168 A1 | 8/2009 | Greenfeld |
| 2009/0278479 A1 | 11/2009 | Platner et al. |
| 2009/0303602 A1 | 12/2009 | Bright et al. |
| 2010/0134038 A1 | 6/2010 | Shackle et al. |
| 2010/0134047 A1 | 6/2010 | Hasnain |
| 2010/0271178 A1 | 10/2010 | Ahmad |
| 2011/0012530 A1 | 1/2011 | Zheng et al. |
| 2011/0026251 A1 | 2/2011 | Liu et al. |
| 2011/0095703 A1 | 4/2011 | Wilson et al. |
| 2011/0317423 A1 | 12/2011 | Chen |
| 2012/0092870 A1 | 4/2012 | Tralli et al. |
| 2012/0146505 A1 | 6/2012 | Jonsson |
| 2013/0043833 A1 | 2/2013 | Katz et al. |
| 2013/0257302 A1 | 10/2013 | Canter et al. |
| 2013/0271001 A1 | 10/2013 | Kurachi et al. |
| 2014/0301062 A1 | 10/2014 | David et al. |

* cited by examiner

REACTIVE POWER BALANCING CURRENT LIMITED POWER SUPPLY FOR DRIVING FLOATING DC LOADS

CLAIM OF PRIORITY

The present application is based on and a claim to priority is made under 35 U.S.C. Section 119(e) to provisional patent application currently pending in the U.S. Patent and Trademark Office, having Ser. No. 61/792,831 and a filing date of Mar. 15, 2013, the entirety of which is incorporated herein by reference.

BACKGROUND OF THE INVENTION

1. Field of the Invention

The present invention is directed to a reactive power balancing current limited power supply (RPBCLPS) for driving floating DC loads, such as for LED lighting, battery charging stations, and other applications. More in particular, the invention is directed to a power supply which utilizes capacitive reactance to limit the current being supplied to the load, rather than inductance. Accordingly, the present invention provides improved power supply efficiency, limits surge when first powered, improves reactive power balance of the local premises and/or local grid, improves power quality of the electrical grid, and reduces EMI present on the grid.

2. Description of the Related Art

The advent of smart grids and the related evolution in the interconnectivity of electrical power distribution systems, including both upstream and downstream effects of local premises consumption on the power grid, are beginning to change the way that power distribution systems are engineered. For instance, a certain degree of computerized control and monitoring of power consumption is beginning to be implemented as not only energy consumption patterns evolve, but also as new classes of electricity consuming devices emerge. By way of further example, new technologies are giving rise to electrical battery powering of lawnmowers, vehicles, backup power supplies for household or commercial use, etc., such that large scale localized battery charging is becoming an important design consideration. As another example, light emitting diode ("LED") technology is making its way into mainstream lighting applications, including residential and commercial buildings, alike, as well as in street lights, stadiums, and other municipal applications. Other examples include a variety of intelligent systems on premises, from security applications to heating and cooling, to household appliances.

With such changes come certain new challenges, particularly in the way devices are powered, which can have various effects on the local premises as well as the broader energy grid. This presently entails a variety of drawbacks that remain with implementation of current technologies, in addition to the various shortcomings associated with the aforementioned newly emerging technologies. As such, there is a need for providing an improved means to power both traditional and newly emerging devices.

Before discussing in more detail the various shortcomings of current power supplies and related devices and systems, it will help to provide several definitions which set the stage for understanding the various needs in the art.

"Floating Loads" are electrical loads that are not attached to a fixed potential (such as ground), but "float" up and down the voltage range as needed. Examples of floating loads are: LEDs, LED Strings (series connected), LED arrays (a group of series connected and parallel connected LEDs), batteries, motors, low voltage halogen lamps, incandescent lamps, LED bulbs, resistive heating elements, to name a few.

"Reactive Power Balancing" refers to a device related phenomenon wherein the device, when powered, improves the power factor of a building or grid by adding capacitive reactance to an inductive load.

"Current Limited" means that the maximum current that can flow in the connected load is limited and defined by the maximum voltage and frequency.

"AC" or Alternating Current refers to an electrical generator's output as alternating positive to negative around a neutral with currents flowing in one direction on the positive cycle and in the opposite direction on the negative cycle. By contrast, "DC" or Direct Current flows in a constant direction (unidirectional flow of electric charge).

In light of the foregoing definitions, one problem in the art involves the use of magnetics (inductors or transformers) by typical AC/DC power supplies to reduce voltages to usable levels for solid state components or batteries. Solid state devices and batteries require DC power and cannot work with AC power directly. As such, high frequency switching circuits are used to perform the voltage reduction. This creates high frequency current harmonics that must be filtered at the power supply. Any unfiltered high frequency current harmonics will pollute the "mains" with what is known as "conducted EMI." As the conducted EMI propagates along the mains "radiated EMI" is generated. Conducted and radiated EMI create problems by interfering with radio, and other wireless control and communication systems.

Also, by using magnetics, rectifying the AC, and adding storage capacitors in the power supply, the power supply uses "reactive energy" to charge inductors and capacitors (reactive components). This technique deviates from the ideal "resistive" load that power companies prefer to drive. Reactive energy is not used up but is conserved and released back into the power grid. This creates a problem in that reactive energy must still be delivered to charge the reactive components. Regarding power supplies, in particular, the inductive nature of the traditional power supply reduces the overall power factor ("PF") of the building electrical system unless corrected inside the power supply—which adds cost, inefficiency, and complexity to the power supply (therefore, less "green"). Even though a single power supply can correct its own power factor, it only improves the overall power factor by adding more real power to the system; it does not help balance the inductance and reactance present on the grid. So, at best, it is neutral. In other words, while PFCorrected power supplies may not add to the overall reactive energy problem, they do not help it either.

By way of further background, it is noted that "Power Factor" (or simply "PF") is a measure of how effectively electrical power is being used. A high PF benefits both the customer and the utility, while a low PF indicates poor utilization of electrical power and adds cost to the delivery of power to the customer which is passed on as higher energy cost. PF is a value from 0 to 1 (or 0 to 100%). Resistive is 1 and pure reactance (inductance or capacitance) is 0. The power company prefers to drive resistive loads because that is the power the customer is charged for in their buildings.

Various types of power are at work to provide us with electrical energy. Here is what each one is doing:

"Working Power" (kW or kilowatts), also called "true" or "real" power, is the portion of power used in all electrical appliances to perform the work of heating, lighting, motion, etc.

"Reactive Power" (kVAR's or kilovolt-amperes-reactive), also known as non-working power, exists in inductive loads to generate and sustain a magnetic field or in a capacitor to sustain an electrical field. Common types of inductive loads are motors, compressors and lighting ballasts.

Homes and businesses have mainly resistive and inductive loads, but few capacitive loads such as some compact fluorescent lamps ("CFLs") or emergency exit signs. The ratio between these two types of loads becomes important with addition of more inductive equipment which reduces the PF from an ideal value of 1 or 100%.

"Apparent Power" (kVA or kilovolt-amperes) is the vector sum of Working Power to Reactive Power.

Power Factor (PF) is therefore defined as the ratio of working power to apparent power (PF=kW/kVA). The typical value is about 0.8. The utility company charges for both how much power the customer actually uses and for the excess power that the utility was required to supply. Thus, low PF results in higher utility costs. Low PF also results in overheating in wires, circuit boards and motors. It is therefore in the customer's best interest to maintain a PF as close to 100% as is economically feasible.

Turning to a more detailed explanation on the definition and role of "Inductive Reactive Energy": When a voltage is applied to an inductor the current will charge the magnetic field. The magnetic field and current will rise linearly, but will lag the voltage by 90 degrees. Every electric load that works with magnetic fields (motors, chokes, transformers, inductive heating, arc-welding generators) produces a varying degree of electrical lag, which is called inductance. The line current drawn by an inductive load consists of two components: magnetizing current and power-producing current. The magnetizing current is the current required to sustain the electromagnetic flux or field strength in the machine. This component of current creates reactive power that does not do useful "work," but circulates between the generator and the load. It places a heavier drain on the power source, as well as on the power source's distribution system. The real (working) power-producing current is the current that reacts with the magnetic flux to produce the mechanical output of the motor.

Turning to a more detailed explanation on the definition and role of "Capacitive Reactive Energy": When a voltage is applied to a capacitor the current creates an electrostatic field. The voltage rises as the capacitor charges up its field. The voltage will lag the current by 90 degrees. The current thus "leads" the voltage. If a charged capacitor is connected in parallel to an inductor, the capacitor will discharge into the inductor, creating a magnetic field. When the capacitor is completely discharged, the inductor then discharges its magnetic field, and charges up the capacitor. If there was no resistance in the process inherent in real components, this action would go on forever; a true perpetual motion machine. The capacitance acts as a source of energy to charge the magnetic field. The capacitor sees the inductor as a reactive load. The two components are opposite in nature and complement each other. Reactive currents flowing in a power grid are doing the same thing as the example above. As the AC voltage swings positive through zero and then negative, the reactive elements attached to the grid will charge and discharge on each cycle. This creates a current flow first in one direction and then the opposite direction. Most of the electrical loads on the grid are inductive and so the power company adds capacitance to the grid to locally compensate. The more local the capacitance is to the inductive loads the less energy is lost in the wires and transformers.

It is thus important note that when the power company first turns on, it charges up the reactive power in the grid, and then begins delivering real power to the loads. In an ideal world where wires and transformers would not have resistance, this would happen one time and the reactive energy would continuously flow back and forth on the grid without loss. In the real world the wire and transformer resistances create heat, eventually dissipating the reactive energy unless it is regenerated by the power company.

In light of the above considerations, power companies routinely add thousands of capacitors to the grid to reduce reactive energy losses. Many companies are in the business of evaluating building power factor and designing custom solutions for buildings or other localities. They may add capacitors at individual loads or they may add a bulk capacitor at the service point and actively monitor power factor and switch the capacitors in and out of the circuit as needed. The power companies would like the customers to take care of their power factor problem in this way since it helps them deliver power more effectively and they are free from the expense and maintenance of adding capacitance. They are giving incentives to customers by beginning to charge for poor power factor on a monthly basis. It is obviously better to purchase the equipment, own it and get rid of the monthly charge.

It would therefore be beneficial to provide a power supply solution that a) removes existing inductive lighting and other devices from the building or other locale, which reduces the inductive reactive energy required by the building/location; and which further b) adds local capacitance to the local/ building power grid.

One more important figure of merit to note is "Power Quality" which determines the fitness of electrical power to consumer devices. Synchronization of the voltage frequency and phase allows electrical systems to function without significant loss of performance or life. The term "Power Quality" is used to describe electric power that drives an electrical load and the load's ability to function properly. Without the proper power, an electrical device (or load) may malfunction, fail prematurely or not operate at all.

The electric power industry typically comprises electricity generation (AC power), electric power transmission and ultimately electricity distribution to an electricity meter located at the premises of the end user of the electric power. The electricity then moves through the wiring system of the end user until it reaches the load. The complexity of the system to move electric energy from the point of production to the point of consumption combined with variations in weather, generation, demand and other factors provide many opportunities for the quality of the supply of electric power to be compromised.

While "power quality" is a convenient term for many, it is the quality of the voltage—rather than power or current—that is actually described by the term. The voltage becomes distorted away from a pure sinusoid. This distortion happens when loads introduce current harmonics (120, 180, 240, etc.) of the 60 Hz sine wave back into the system. These harmonics will alter the shape of the incoming voltage waveform which other equipment will "see." Switching power supplies, electronic ballasts, phase dimmers, and on/off equipment are the main contributors of current harmonics. If the offending currents are removed, the voltage waveform will once again be purely sinusoidal.

In light of the foregoing background, it would therefore be beneficial to provide a power supply that uses an alternative technology, instead of inductance, to limit the current being supplied to the load. It would be a further benefit for such a power supply to more efficiently pass currents to LED or other devices/loads (thus, improving power quality in a building or other premises as well).

It would also be advantageous if such a power supply solution could permit removal of existing inductive lighting and other devices from buildings or other locales, so as to reduce the overall inductive reactive energy required by the building/location. It would be another important benefit if such a power supply could also add local capacitance to the local/building power grid.

It would be further beneficial for such a power supply solution to limit surge when first powered, improve reactive power balance of the local premises and/or local grid, improve power quality of the electrical grid, and reduce EMI already present on the grid.

SUMMARY OF THE INVENTION

The present invention is directed to a reactive power balancing current limited power supply (RPBCLPS) for driving floating DC loads, such as for LED lighting, battery charging stations, and other applications which involve converting high voltage AC power to low voltage DC power for loads that require limited current. More in particular, the invention is directed to a power supply which utilizes capacitive reactance to limit the current being supplied to the load, rather than inductance. Accordingly, the present invention provides improved power supply efficiency, limits surge when first powered, improves reactive power balance of the local premises and/or local grid, improves power quality of the electrical grid, and reduces EMI present on the grid.

The RPBCLPS comprises an AC input, such as, but not limited to, a 50VAC-480VAC input. A fuse is disposed in electrical communication with the input and with a capacitor. The capacitor is used to transfer charge from input to the load. The capacitor is protected from current harmonics by the fuse. The capacitor is protected from voltage spikes by a diode clamp.

The RPBCLPS further comprises a rectifier structured to rectify the AC current into DC current for driving the load. In at least one embodiment, the rectifier can comprise a diode-based full-wave bridge structure. It is, however, within the scope and intent of the present invention that a variety of other suitable structures and types of rectifiers may be utilized, including but not limited to, half-wave rectifiers, other rectifier architectures, characteristics, parameters, etc.

With regard to system-level implementation, by incorporating light fixtures or other devices that use the inventive power supply of the present invention, the electric utility customer is able to do two things with the same dollar. The first is to remove existing inductive lighting (fluorescent and HID) and other devices from the building or other locale. This reduces the inductive reactive energy required by the building/location. Second, they can implement RPBCLPS-powered LED lighting other devices, thus adding local capacitance to the local/building power grid.

Turning now to additional applications of the present invention, including some system-level applications, one such application involves providing functional distributed capacitance throughout a city by replacing inductive street lights and using RPBCLPS based LED lighting. In such an embodiment, during the daytime when the power demand is high the street light RPBCLPS units act as pure capacitive loads to the grid helping to correct power factor throughout the city. They can do this because to turn off the light the LED is shorted out allowing the fixture to make no light during the day but still being fully connected to the power grid. During the night the LED is un-shorted to make light when power demand is less.

In another embodiment, battery charging stations positioned around a city will perform the same type of function as noted in the preceding paragraph. Using RPBCLPS based battery chargers will help clean up the power grid and make it more efficient. The chargers will also be light-weight, portable and rugged. On a similar note, utilizing RPBCLPS based golf cart charging stations at golf courses will provide another source of ready capacitance for the grid. Other applications of the present invention include emergency lighting systems, DC motors, and aviation electronics.

In at least one embodiment, the power supply of the present invention is further structured to facilitate adjustable dimming of an LED or LED array, utilizing a variable AC voltage input. Incorporation of the variable AC voltage input permits adjustment of the current in accordance with a control input to correspondingly adjust the current flowing through the LED, and accordingly, the light intensity output thereof.

In a similar embodiment, the power supply of the present invention is configured to facilitate adjustable speed control of a DC motor; wherein incorporation of a variable AC voltage input permits adjustment of the current in accordance with a control input to correspondingly adjust speed of the DC motor.

In other embodiments, the RPBCLPS can be structured to provide one or more current limits at the load. In one embodiment, the current limit may comprise an integrated circuit configuration. In another embodiment, the current limit can comprise a simpler transistor-based design.

In still other embodiments, the power supply of the present invention can be structured to provide a remote shutdown capability, such as by incorporating a microcontroller or relay switch to facilitate remote shutdown of the load.

In one additional embodiment, the RPBCLPS can be structured to provide on/off control of an LED light, such as in a street light application. In this embodiment, the LED or LED array can be turned off by shorting it; wherein a solid state relay is disposed in interconnecting electrical communication with the LED and a corresponding shorting switch.

These and other objects, features and advantages of the present invention will become clearer when the drawings as well as the detailed description are taken into consideration.

DETAILED DESCRIPTION OF THE PREFERRED EMBODIMENT

The present invention is directed to a reactive power balancing current limited power supply (RPBCLPS) for driving floating DC loads, such as for LED lighting, battery charging stations, and other applications which involve converting high voltage AC power to low voltage DC power for loads that require limited current. More in particular, the invention is directed to a power supply which utilizes capacitive reactance to limit the current being supplied to the load, rather than inductance. Accordingly, the present invention provides improved power supply efficiency, limits surge when first powered, improves reactive power balance of the local premises and/or local grid, improves power quality of the electrical grid, and reduces EMI present on the grid.

Figure 1:
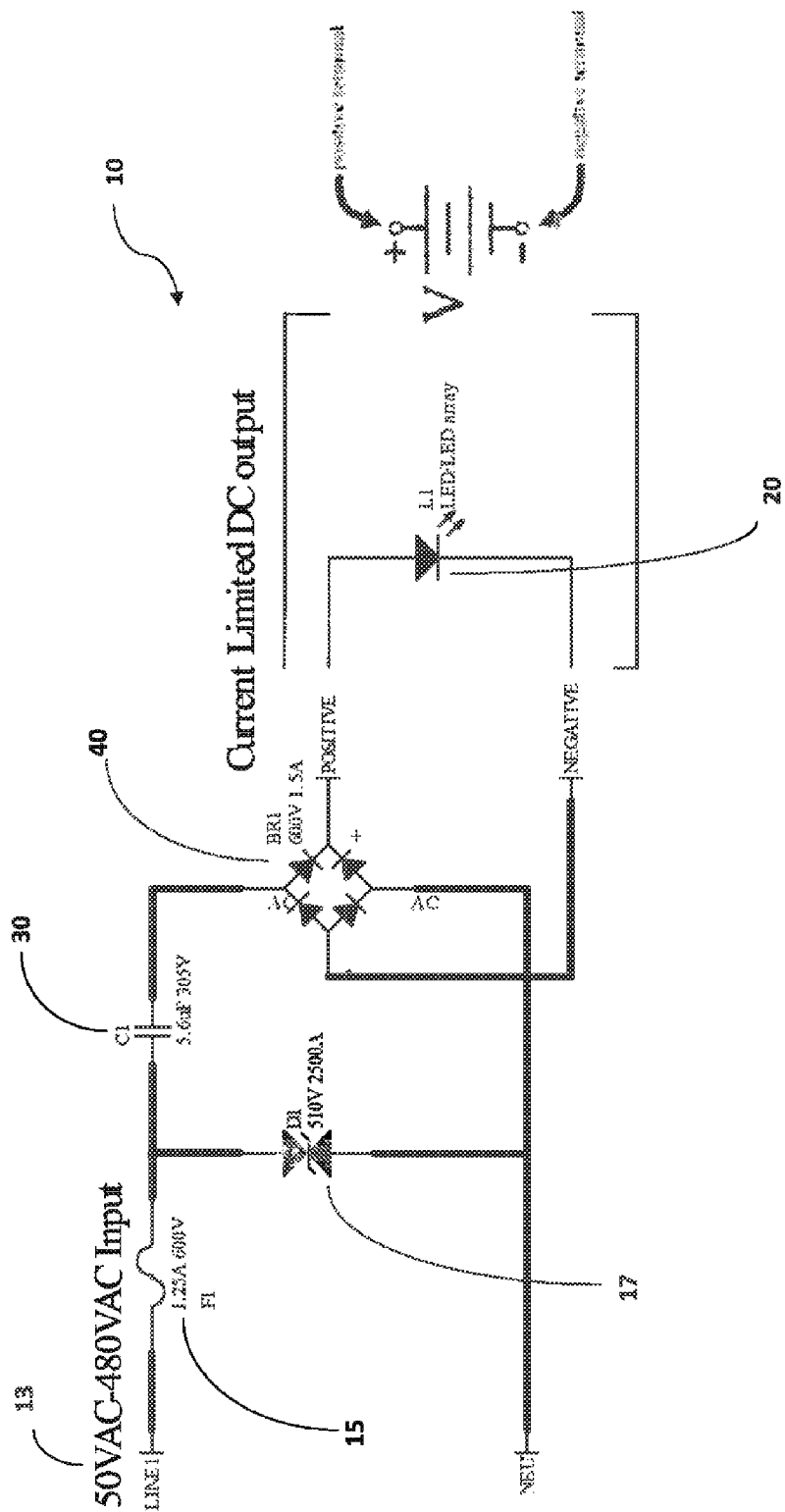
FIG. 1 is a circuit diagram of the power supply of the present invention configured to power an LED or LED array.

As schematically represented in the circuit diagram of FIG. 1, one embodiment of the present invention is shown, namely, a capacitance based reactive power balancing current limited power supply ("RPBCLPS") 10 for driving an LED or LED array. As noted in the background section, above, one key distinction between a RPBCLPS power supply and a Power Factor Corrected (PFCorrected) power supply is simple: a reactive power balancing power supply helps improve the building power factor by offsetting the inductive reactive energy with capacitive reactive energy; whereas a PFCorrected supply is neutral (it does not add to the problem, but it does not help either). As seen in FIG. 1, the only reactive element of the reactive power balancing power supply 10 is a capacitor 20. The capacitive current balances the inductive current in the grid, thereby, improving PF. At the same time, the power supply produces real work by making light or charging batteries.

Thus, the reactive power balancing power supply 10 uses capacitive reactance to limit the current being supplied to the load, not inductance. The capacitive current will lead the voltage the exact opposite amount as an inductive current will lag, thereby, cancelling the total shift to the voltage. This improves the building and grid PF.

Figure 1A:
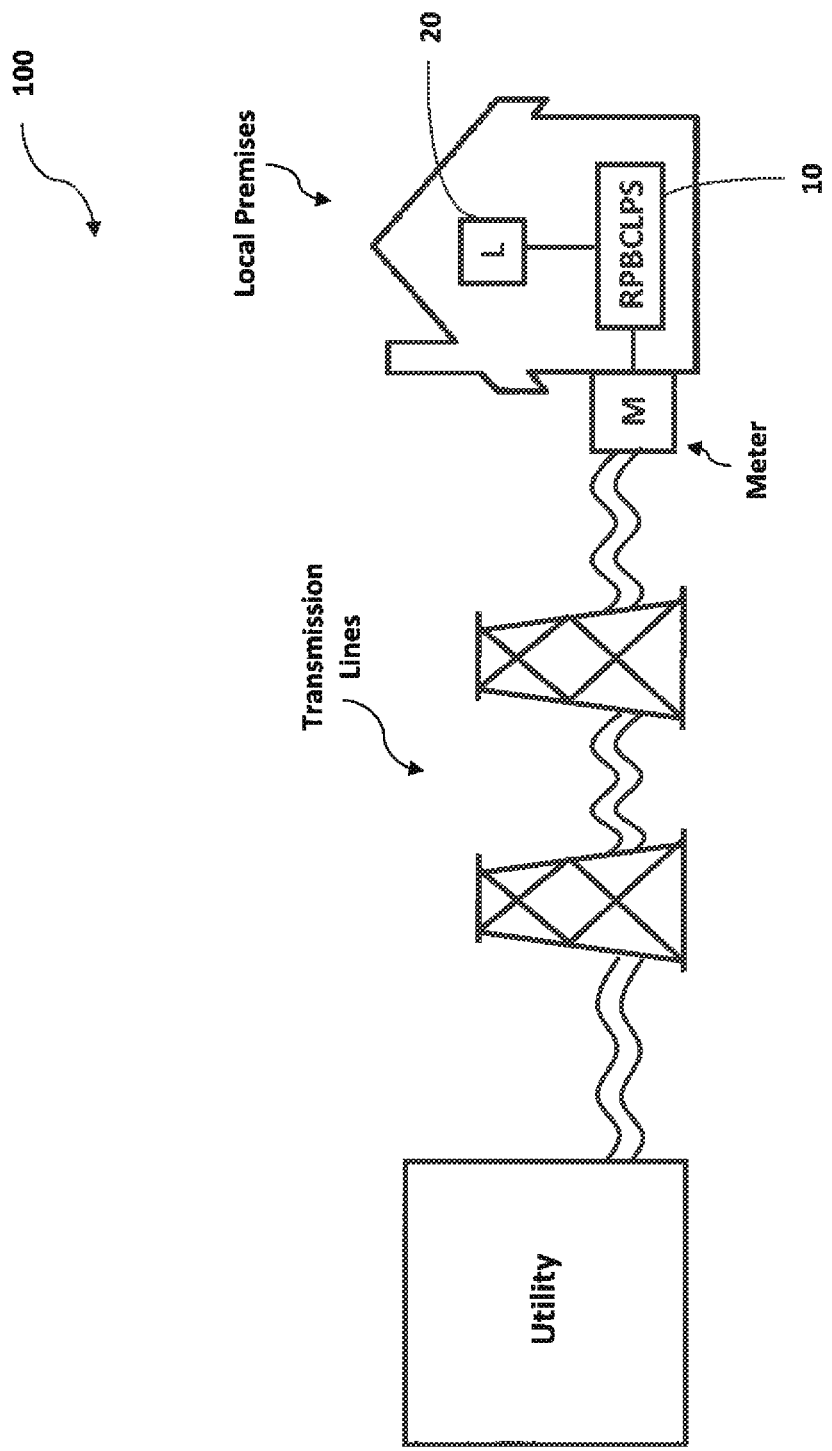
FIG. 1A is a schematic system-level diagram of a power grid depicting various subsystems and components, including the power supply of the present invention.

With reference to FIG. 1A, a generic system scenario 100 is presented to generally depict the interaction between various systems-level elements that either directly or indirectly involve the present invention. As depicted, a power company or "utility" generates electrical power that is transmitted via transmission lines to a transformer, meter, or other similar conversion device that is, in turn, disposed in electrical communication with the RPBCLPS 10. Accordingly, the RPBCLPS 10, is the recipient of electrical current that is to be converted into an appropriate form to power one or more electrical devices 20 (or "loads").

As noted, above, when the power company first turns on, it charges up the reactive power in the grid, and then begins delivering real power to the loads 20. In an ideal world where wires and transformers would not have resistance, this would happen one time and the reactive energy would continuously flow back and forth on the grid without loss. In the real world the wire and transformer resistances create heat, eventually dissipating the reactive energy unless it is regenerated by the power company. Using equipment that uses capacitive reactance will help reduce the distance the reactive energy must travel in the grid. As also mentioned previously, power companies routinely add thousands of capacitors to the grid to reduce reactive energy losses, which entails various drawbacks, both on a system level an on an consumer economics level. By incorporating light fixtures or other devices that use the reactive power balancing power supply 10 of the present invention, the customer is able to do two things with the same dollar. The first is to remove existing inductive lighting (fluorescent and HID) and other devices from the building or other locale. This reduces the inductive reactive energy required by the building/location. Second, they can implement RPBCLPS-powered LED lighting other devices, thus adding local capacitance to the local/building power grid.

With continued reference to FIG. 1, the RPBCLPS 10 comprises an AC input 13, such as, but not limited to, a 50VAC-480VAC input (at LINE 1). A fuse 15 such as, but not limited to, a 1.25 A 600V fuse (F1) is disposed in electrical communication with the input 13 and with a capacitor 30, depicted as a series capacitor (C1) in FIG. 1. The capacitor 30 is used to transfer charge from input to the load. The amount of charge transferred per 50/60 Hz cycle limits the load current capability. The capacitors 30 are protected from the current harmonics by the fuse 15. The capacitors 30 are protected from voltage spikes present in poor power quality sources by a diode clamp 17. By way of example, the capacitors 30 may be characterized by parameters including, but not limited to, the 5.6 uF 205V capacitor 30 shown in FIG. 1. Also by way of example, the diode clamps 17 may be characterized by parameters including, but not limited to, the 510V 2,500 A diode clamp (D1) shown in FIG. 1.

The RPBCLPS 10 further comprises a rectifier 40, structured to rectify the AC current into DC current for driving the load 20. As pictured in FIG. 1, the rectifier 40 can comprise a diode-based full-wave 600V 1.5 A bridge structure (BR1). It is, however, within the scope and intent of the present invention that a variety of other suitable structures and types of rectifiers 40 may be utilized, including but not limited to, half-wave rectifiers, other rectifier architectures, characteristics, parameters, etc.

Since the precise load and corresponding circuit component parameters depicted in FIG. 1 comprise just one example of many possibilities, it is within the scope and intent of the present invention that other parameters and values may be utilized as well. For instance, selection of the power supply design parameters can include calculation of a desired AC Line Series Capacitor Value C1. As depicted, the series capacitor 30 is used to transfer charge from input 13 to the load 20. The amount of charge transferred per 50/60 Hz cycle limits the load current capability. Approximate load current capability is given by the following equations:

$$IOUT \approx 4 \cdot FREQ(Hz) \cdot C1 \cdot (VIN\sqrt{2} - VOUT - 3VD) \quad \text{Equation 1a: Full-wave}$$

$$IOUT \approx FREQ(Hz) \cdot C1 \cdot (2VIN\sqrt{2} - VOUT - 2VD) \quad \text{Equation 1b: Half-wave}$$

where
IOUT is the maximum output current;
FREQ(Hz) is the AC line frequency;
C1 is the series cap on the AC line;
VIN is the RMS AC line voltage;
VOUT is the DC output voltage the load presents; and
VD is the diode forward voltage of the bridge diodes.

The equations below have been rearranged to calculate the capacitance required for a desired current.

$$C1 \geq IOUT/4*FREQ(Hz)*(VIN\sqrt{2} - VOUT - 3VD) \quad \text{Equation 2a: Full-wave:}$$

$$C1 \geq IOUT/FREQ(Hz)*(2VIN\sqrt{2} - VOUT - 2VD) \quad \text{Equation 2b: Half-wave:}$$

Regarding its "Ripple Current Rating," the C1 capacitor 30 should be AC rated. DC rated capacitors generally have higher ESR and may overheat when subjected to AC current. Ripple current is at the line frequency. Accordingly, the RMS magnitude is given by the following equation:

$$Iripple = VIN \cdot FREQ(Hz) \cdot 2\pi \cdot C1.$$

As for its "Voltage Rating," the C1 capacitor 30 should be AC rated for the maximum expected AC line voltage.

As for its "Safety Rating," the C1 capacitor 30 should be rated X2 for UL considerations.

As indicated, above, the capacitive based power supply 10 thus introduces a current phase shift that is opposite the inductive phase shift, thereby improving the power factor of both the building and the grid which is connected to the building. The inventive power supply 10 is also structured to dampen resonances present in systems where capacitance and inductance are present. It does this by converting rising voltages into real power used in the load 20, light in the case of an LED load. The effect of dissipating more power with more voltage helps the system to remain stable. Pure capacitor banks cannot prevent harmonic oscillations because they are purely reactive and will return whatever power they receive back to the mains. The power supply 10 also improves power quality by removing higher frequency harmonics from the mains and produces useful work with them such as making light or charging a battery.

As an additional benefit, the RPBCLPS 10 delivers limited current to the load 20 no matter where on the sine-wave the voltage is turned on. There are no measurable excess start-up current surges. This is very beneficial in a system because it allows the breakers and wire to be used to full capacity.

Turning in more detail to the particular application of LED lighting, the RPBCLPS 10 can automatically adapt to any LED or LED array as long as the LED is rated for the peak currents in the worst case scenario (corresponding maximum or "highest" AC voltage). In such cases, the reactive power balancing power supply 10 used in a lighting system as the ballast for an LED will help remove the current harmonics from the mains. In this regard, the impedance of the capacitor 30 naturally goes down with the raising of the frequency. The higher the current frequency results in less impedance in the capacitor 30. The less impedance means the more current. Since the harmonic currents are smaller by orders of magnitude, they will add to the power supply's current output but in a limited way. The power supply 10 will efficiently pass these currents to the LED 20 and produce more light. In fact, it will use the higher frequency currents more efficiently than the lower frequency currents to make light. Making light is real power usage which effectively removes the harmonics from the grid. By using capacitive power supplies for lighting the power quality in a building will be improved. As noted, above, the capacitors 30 are protected from the harmonics by the fuse 15. The capacitors 30 are protected from voltage spikes present in poor power quality sources by the diode clamp 17.

The RPBCLPS 10 also provides benefits with regard to EMI. The capacitive based power supply 10 uses no high frequency switching elements. The mains frequency is switched in the diode bridge and produces little, if any, harmful EMI. The aforementioned EMI typically comprises, and is therefore defined as, the unwanted electrical energy in the frequency bands from 150 KHz to 30 MHz. The large capacitance used in the RPBCLPS 10 absorbs these frequencies and converts them to light which prevents the unwanted energy from propagating out into the grid. This is possible because the RPBCLPS 10 preferably uses polypropylene power film capacitors 30 which have very little inductance and high frequency response. It is, however, within the scope and intent of the present invention that other suitable capacitor materials and structures may be utilized.

Turning now to additional applications of the present invention, including some system-level applications, one such application involves providing functional distributed capacitance throughout a city by replacing inductive street lights and using RPBCLPS 10 based LED lighting 20. In such an embodiment, during the daytime when the power demand is high the street light RPBCLPS units 10 act as pure capacitive loads to the grid helping to correct power factor through-out the city. They can do this because to turn off the light the LED is shorted out allowing the fixture to make no light during the day but still being fully connected to the power grid (see FIG. 6). During the night the LED 20 is un-shorted to make light when power demand is less. This is the perfect scenario for distributing capacitance uniformly across the grid. Since the grid is one massively interconnected system, all the different currents from loads connected to the grid interact. A capacitor placed anywhere on the grid will help with power factor correction, however, equally distributing capacitors with street lights and parking lot lights will shorten the distance the reactive source is from the reactive load. This reduces loss in reactive energy.

In another embodiment, battery charging stations positioned around a city will perform the same type of function as noted in the preceding paragraph. Using RPBCLPS 10 based battery chargers will help clean up the power grid and make it more efficient. The chargers will also be light-weight, portable and rugged. On a similar note, utilizing RPBCLPS 10 based golf cart charging stations at golf courses will provide another source of ready capacitance for the grid.

Emergency lighting systems which are based on battery backup also require charging batteries from high voltage AC sources. These chargers are almost always transformer-based designs which are large, heavy, and inductively reactive. By replacing these chargers with RPBCLPS 10 based units the capacitance will be available to the grid. Emergency lighting is essential in all public buildings, private businesses, and government facilities, which provides numerous localities to incorporate the RPBCLPS 10 based units.

Perhaps even more ubiquitous are DC motors, which are plentiful and inexpensive and are used in a wide range of applications, ranging from household to industrial purposes. By using the RPBCLPS 10 to drive DC motors to replace AC motors in many traditional applications which previously favored AC motors, PF can be improved by removing an inductive load from the grid and replacing it with a capacitive load to perform the same function.

As yet another example of a specialized application, aviation power is typically 400 Hz rather 60 Hz. Since the ratio of 400/60 is 6.7, a RPBCLPS 10 rated for 10 watts at 60 Hz will deliver 67 Watts at 400 Hz. This translates to very compact, lightweight ballasts for aviation lighting using LEDs as the light source and capable of running off the highest AC voltages that are ordinarily available. Aviation equipment must also survive the harsh electrical environment and work in temperature extremes of high altitude flight and hot tarmacs. As such, the simplicity of the RPBCLPS 10 and its rugged components make it a natural fit for aircraft electrical systems. This means less fuel is used in a flight to power the electrical loads.

In view of the various scenarios and applications just described, FIGS. 2-6 provide some additional examples of the RPBCLPS 10 used in connection with various loads and related circuitry.

Figure 2:
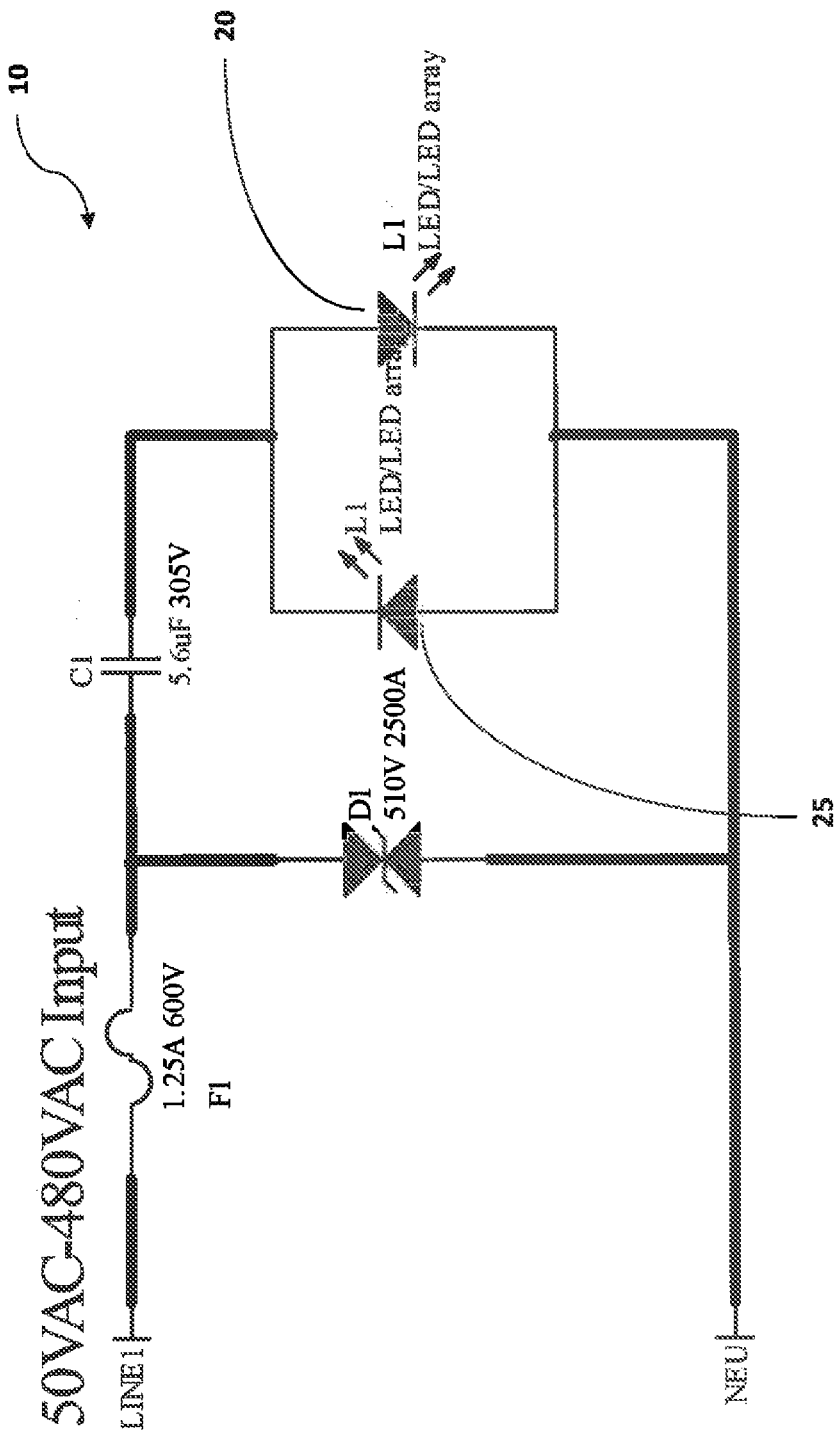
FIG. 2 is a circuit diagram of an alternative rectification approach to the power supply of the present invention, which comprises oppositely disposed LEDs or LED arrays.

With reference to FIG. 2, an alternative embodiment for driving LEDs without using a bridge, such as 40, is shown. In this embodiment, an alternative rectification approach is provided, which comprises oppositely disposed LEDs or LED arrays 20. This configuration provides generally suitable rectification; however, one problem with this specific approach is that the using a rectifying LED 25 is typically much more expensive than using a low cost bridge solution 40.

Figure 2A:
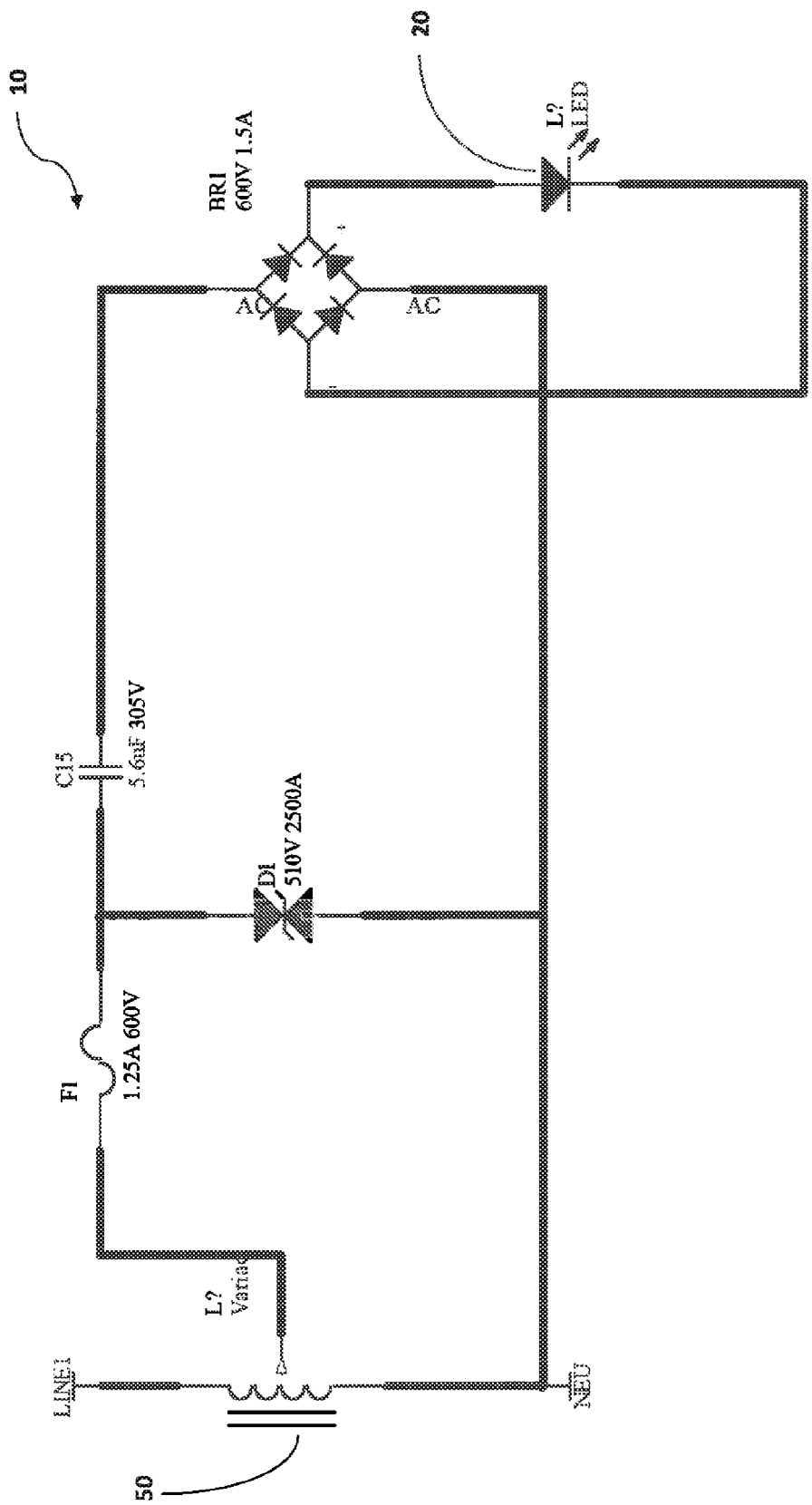
FIG. 2A is a circuit diagram of another embodiment of the power supply of the present invention structured to facilitate adjustable dimming of an LED or LED array.

FIG. 2A depicts another embodiment of the power supply 10 of the present invention which is further structured to facilitate adjustable dimming of an LED or LED array. In this embodiment, the RPBCLPS 10 further comprises a variable AC voltage input 50 which is structured to permit adjustment of the current in accordance with a control input to correspondingly adjust the current flowing through the LED 20, and accordingly, the light intensity output thereof.

Figure 3:
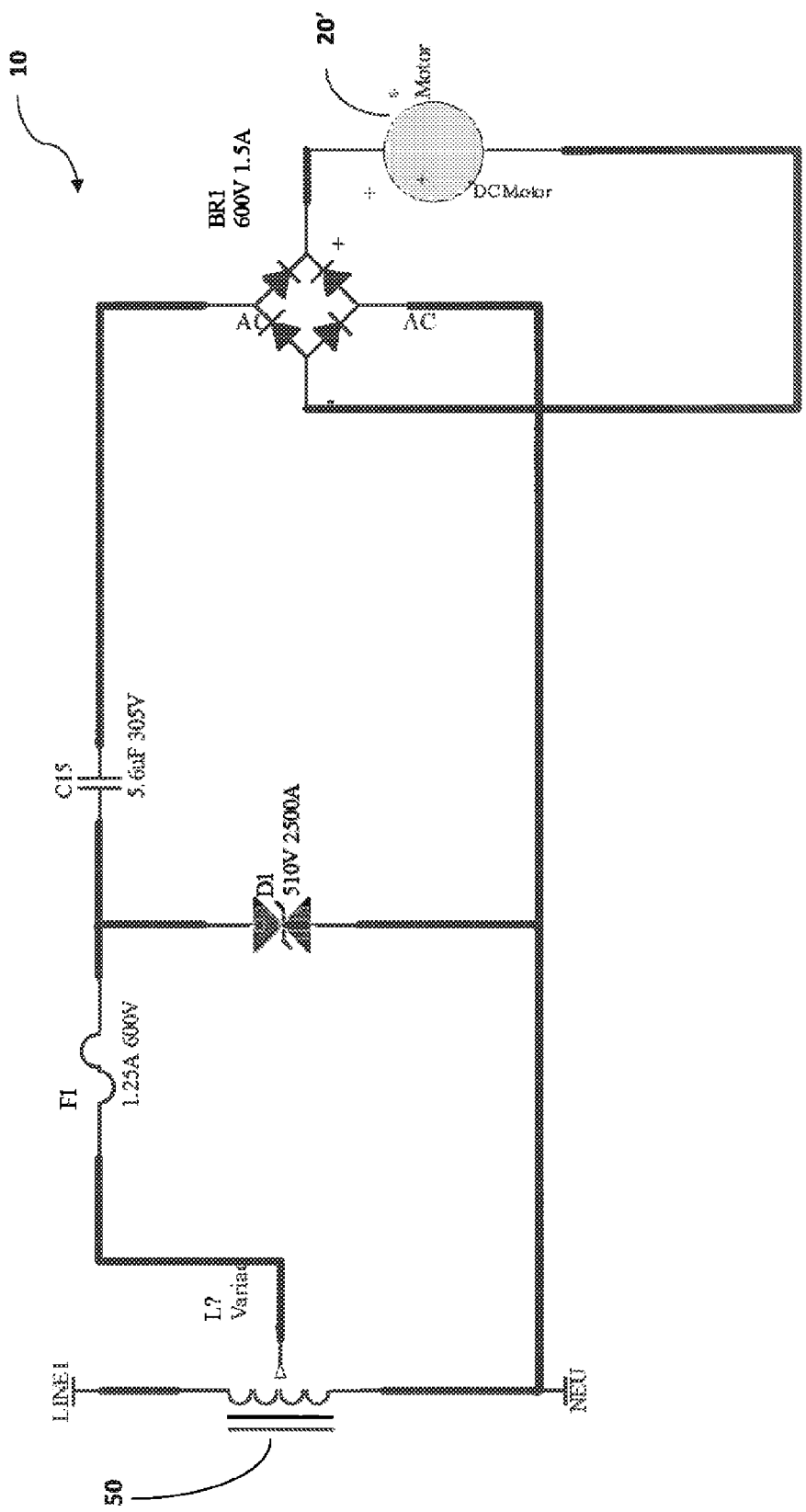
FIG. 3 is a circuit diagram of another embodiment of the power supply of the present invention configured to facilitate adjustable speed control of a DC motor.

FIG. 3 illustrates another embodiment of the power supply 10 of the present invention structured to facilitate adjustable speed control of a DC motor 20'. In this embodiment, the RPBCLPS 10 further comprises a variable AC voltage input 50 which is structured to permit adjustment of the current in accordance with a control input to correspondingly adjust the current flowing through the DC motor 20', and accordingly, the speed output thereof.

Figure 4:
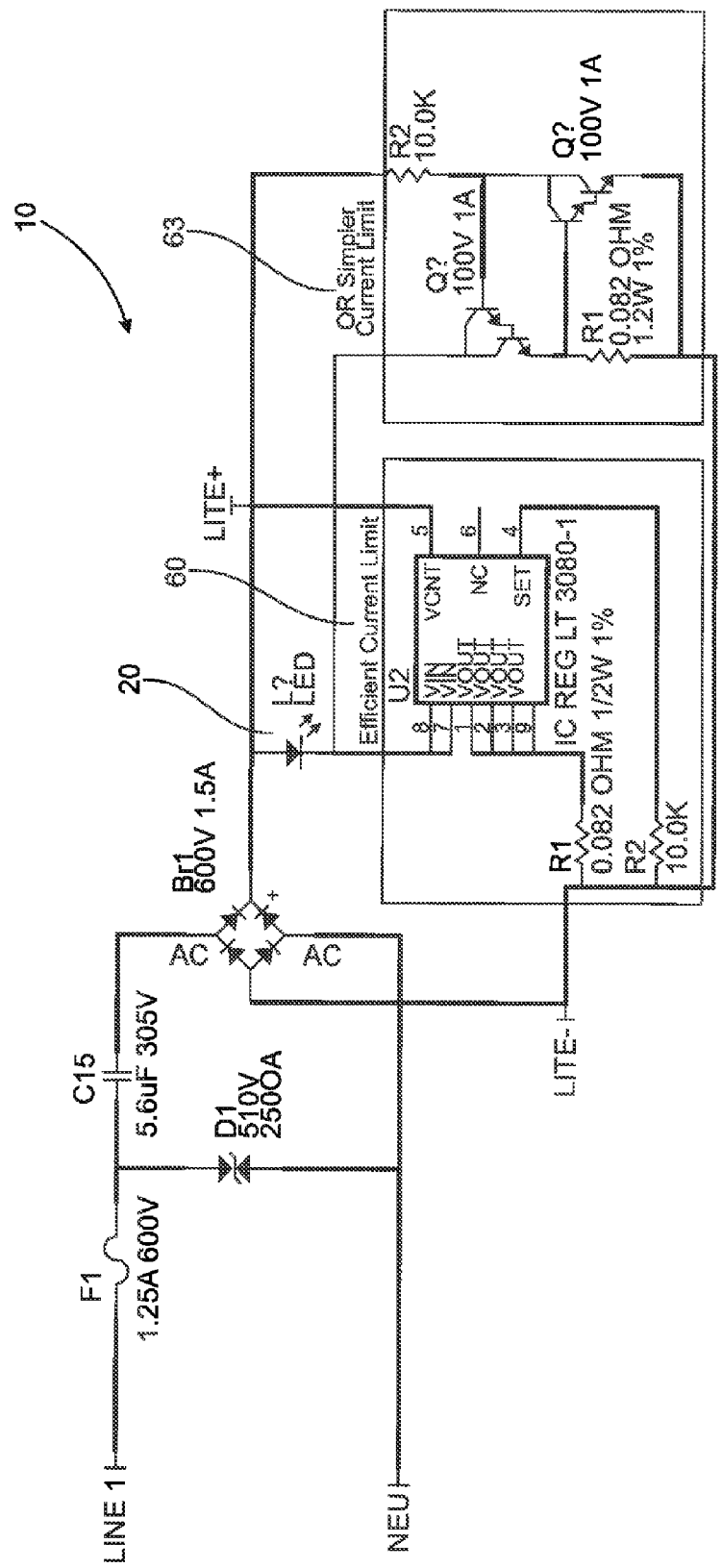
FIG. 4 is a circuit diagram of another embodiment of the power supply of the present invention structured to provide current limits at the load.

FIG. 4 shows yet another embodiment of the RPBCLPS 10 structured to provide current limits at the load 20. This embodiment comprises two solid state current limits at the load 20. The first solid state current limit 60 comprises an integrated circuit configuration (e.g., IC REG LT3080-1) having various control inputs and outputs, as shown. As depicted, the second solid state current limit 63 comprises a simpler transistor-based design.

Figure 5:
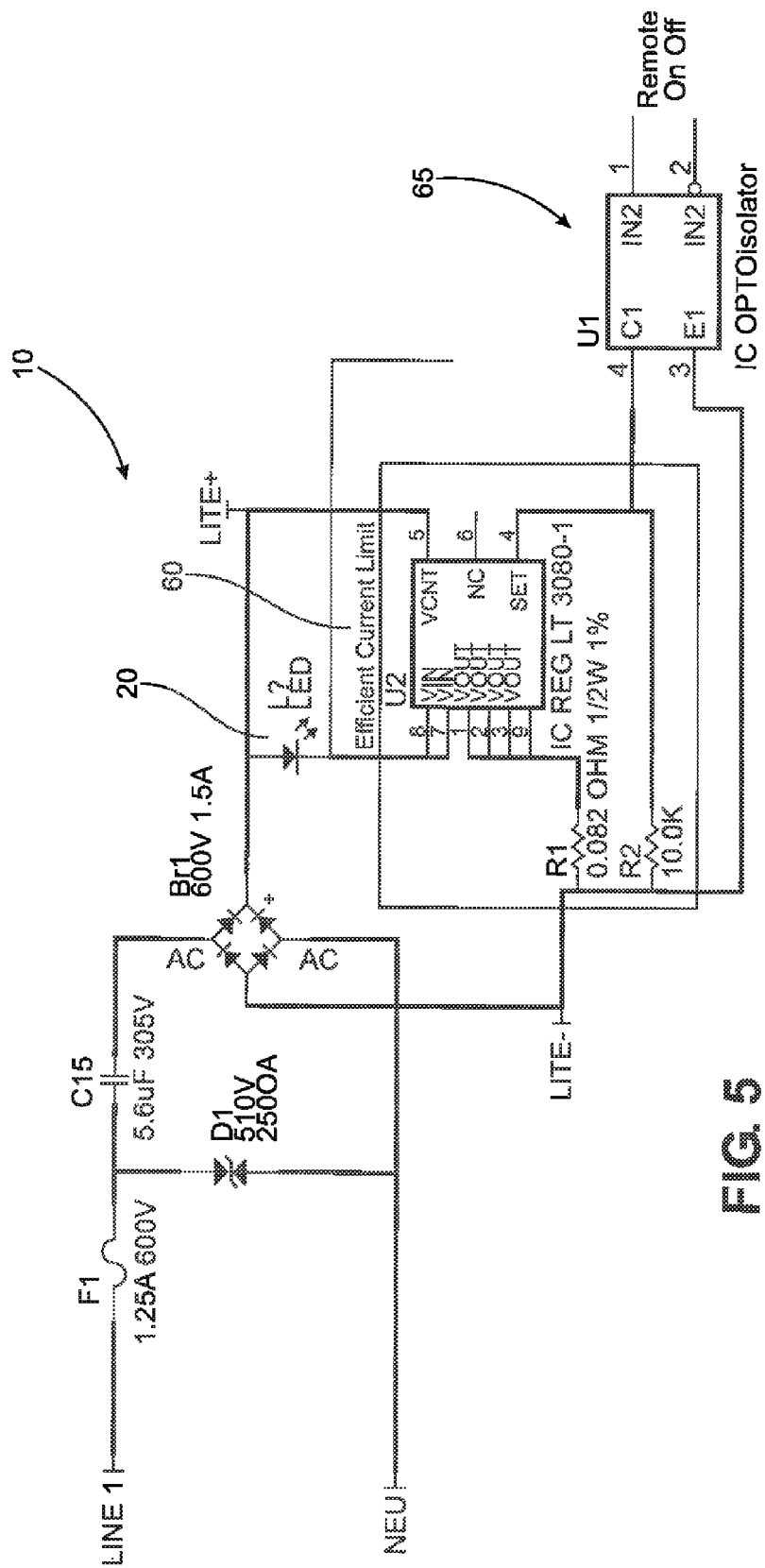
FIG. 5 is a circuit diagram of another embodiment of the power supply of the present invention structured to provide a remote shutdown capability.

FIG. 5 presents still another embodiment of the power supply 10 of the present invention structured to provide a remote shutdown capability. This embodiment also includes a solid state current limit 60 comprising an integrated circuit configuration (e.g., IC REG LT3080-1). Further, a microcontroller or relay switch 65 (e.g., IC OPTOisolator) is disposed and structured to facilitate remote shutdown of said load, such as for a remotely controlled shutdown scenario or other type of remote on/off capability.

Figure 6:
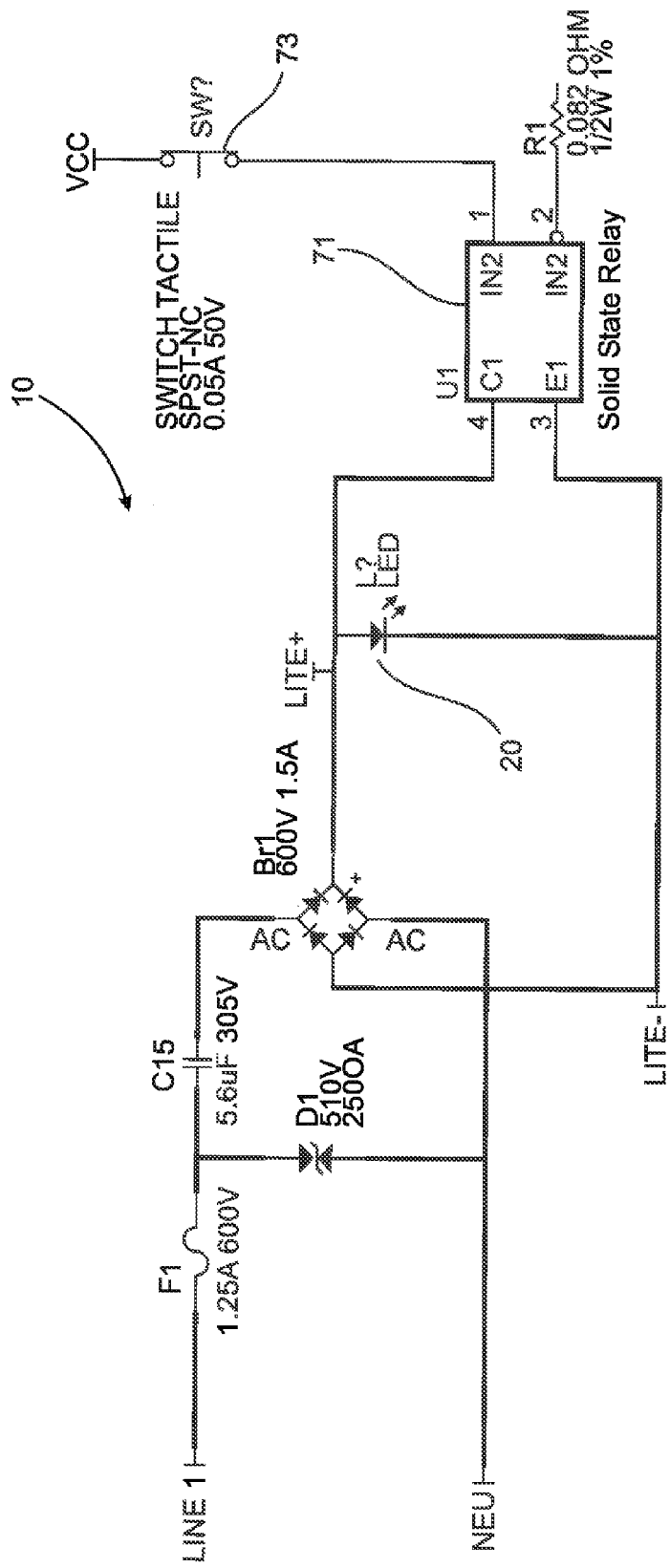
FIG. 6 is a circuit diagram of another embodiment of the power supply of the present invention structured to provide on/off control of an LED light via shorting.

FIG. 6 illustrates one additional embodiment of the RPBCLPS 10 structured to provide on/off control of an LED light, such as in the street light application described, above. In this embodiment, the LED or LED array can be turned off by shorting it. More specifically, as depicted in FIG. 6, a solid state relay 71 is disposed in interconnecting electrical communication with the LED 20 and a shorting switch 73 (e.g., SWITCH TACTILE SPST-NC 0.05 A 50V) to permit turning off of the light by shorting the LED 20.

Since many modifications, variations and changes in detail can be made to the described preferred embodiment of the invention, it is intended that all matters in the foregoing description and shown in the accompanying drawings be interpreted as illustrative and not in a limiting sense. For instance, it is within the scope and intent of the present invention that, in addition to the several examples of loads described herein, a variety of other suitable loads may also be powered by the present invention, with appropriate modification to the above described preferred embodiments. Thus, the scope of the invention should be determined by the appended claims and their legal equivalents.

What is claimed is:

1. A capacitance based reactive power balancing current limited power supply (RPBCLPS) circuit, said circuit comprising:
   an AC current input;
   a fuse disposed in electrical communication with said input and structured to electrically protect a capacitor from high frequency current harmonics and over voltage spikes;
   said capacitor disposed in electrical communication with said fuse and said AC current input, and structured to transfer charge from said AC current input to a local floating DC load;
   a diode clamp disposed in electrical communication with said fuse, said AC current input, and said capacitor, and structured to electrically protect said capacitor from over voltage spikes; and
   a rectifier disposed in electrical communication with said diode clamp, said capacitor, said fuse, and said AC current input, and structured to rectify said AC current input into DC current for driving said DC load;
   wherein said fuse, capacitor, diode clamp, and rectifier are collectively disposed and structured to introduce a current phase shift opposite an inductive phase shift associated with said local floating DC load, such that said current phase shift improves a reactive power balance of at least a local premises associated with said DC load,
   wherein said RPBCLPS circuit includes no inductance circuitry between said AC current input and said rectifier.

2. A circuit as recited in claim 1 structured to convert a rising voltage into real power used in the load, thereby facilitating dampening of resonances present in associated systems where capacitance and inductance are present.

3. A circuit as recited in claim 1 structured to remove higher frequency harmonics from associated mains, thereby improving power quality.

4. A circuit as recited in claim 1 wherein said rectifier is further structured to facilitate switching of a mains frequency.

5. A circuit as recited in claim 1 structured to deliver limited current to the load regardless of where on a sine-wave AC current input a voltage is turned on, thereby avoiding excess start-up current surges.

6. A circuit as recited in claim 1 configured to power at least one LED, wherein said local floating DC load comprises said at least one LED.

7. A circuit as recited in claim 6 further configured to automatically adapt to said at least one LED load, wherein said at least one LED is rated for peak currents operating under a corresponding maximum AC voltage.

8. A circuit as recited in claim 6 further comprising a solid state relay disposed in interconnecting relation between said at least one LED and a shorting switch, thereby permitting switch control of said at least one LED by way of shorting said LED.

9. A circuit as recited in claim 1 wherein said capacitor is structured to absorb EMI in the frequency bands from 150KHz to 30MHz.

10. A circuit as recited in claim 9 wherein said capacitor comprises a polypropylene power film construction.

11. A circuit as recited in claim 1 further comprising a variable AC voltage input structured to permit adjustment of said DC current driving said load.

12. A circuit as recited in claim 1 further comprising at least one current limiting feature.

13. A circuit as recited in claim 12 wherein said at least one current limiting feature comprises a solid state current limit comprising an integrated circuit configuration.

14. A circuit as recited in claim 12 wherein said at least one current limiting feature comprises a transistor based solid state current limit.

15. A circuit as recited in claim 1 further comprising a relay switch structured to facilitate remote shutdown of said load.

16. A circuit as recited in claim 1 wherein said rectifier comprises a bridge structure.

17. A circuit as recited in claim 1 wherein said rectifier comprises at least one LED oppositely disposed to said DC load, said oppositely disposed LED structured to at least partially rectify said AC current input into said DC current for driving said DC load.

18. A circuit as recited in claim 1 wherein said circuit is rated for 10 watts at 60Hz and capable of delivering 67 Watts at 400Hz.

19. A reactive power balancing electrical power distribution system, comprising:
  a utility source of AC electrical power;
  a power distribution grid structured to distribute the AC electrical power provided by said utility source;
  a plurality of DC loads distributed in connection with said power distribution grid and structured to receive the electrical power for driving said DC loads; and
  a plurality of capacitance based reactive power balancing current limited power supplies structured to power said DC loads, wherein each of said power supplies comprises:
    an AC current input;
    a capacitor disposed in electrical communication with said AC current input, and structured to transfer charge from said AC current input to one of said DC loads;
    a fuse disposed in electrical communication with said input and said AC current input, and structured to electrically protect said capacitor from at least high frequency current harmonics;
    a diode clamp disposed in electrical communication with said fuse, said AC current input, and said capacitor, and structured to electrically protect said capacitor from over voltage spikes; and
    a rectifier disposed in electrical communication with said diode clamp, said capacitor, said fuse, and said AC current input, and structured to rectify said AC current input into DC current for driving said one DC load;
    wherein said fuse, capacitor, diode clamp, and rectifier are collectively disposed and structured to improve a reactive power balance of at least a local premises associated with said one DC load,
    wherein said system includes no inductance circuitry between said AC current input and said rectifier.

20. A system as recited in claim 19 wherein individual ones of said plurality of DC loads are cooperatively located to provide functional distributed capacitance throughout a substantial portion of said power distribution grid.

21. A system as recited in claim 19 wherein at least some of said plurality of DC loads comprise LED lights.

22. A system as recited in claim 20 further comprising at least one shorting switch control of said LED lights.

23. A system as recited in claim 21 wherein said LED lights are street lights.

24. A system as recited in claim 19 wherein at least some of said plurality of DC loads comprise battery charging stations.

25. A system as recited in claim 23 wherein said battery charging stations comprise golf cart charging stations, at least some of said golf cart charging stations being disposed in the vicinity of a golf course.

26. A system as recited in claim 23 wherein said battery charging stations comprise backup battery chargers for emergency lighting systems.

27. A system as recited in claim 19 wherein at least some of said plurality of DC loads comprise DC motors.

* * * * *